Oct. 15, 1968    H. W. HART    3,405,686
WATERING SYSTEM FOR NEWLY HATCHED FOWLS
Filed Sept. 16, 1966    2 Sheets—Sheet 1
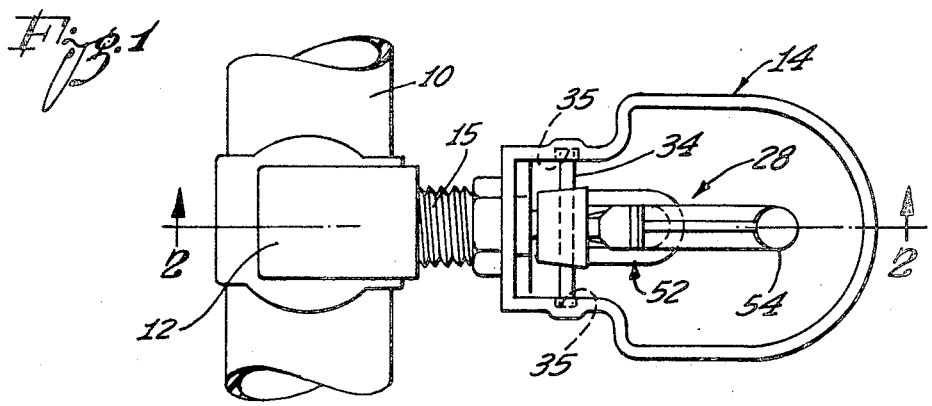
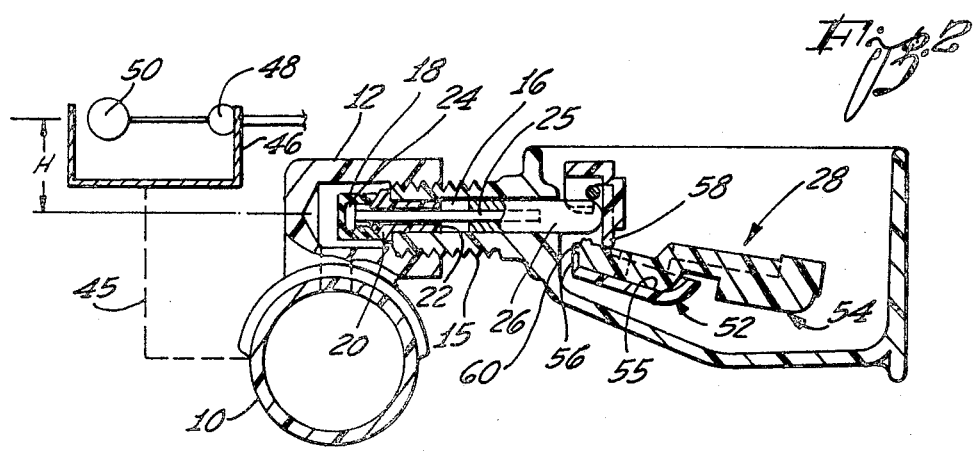
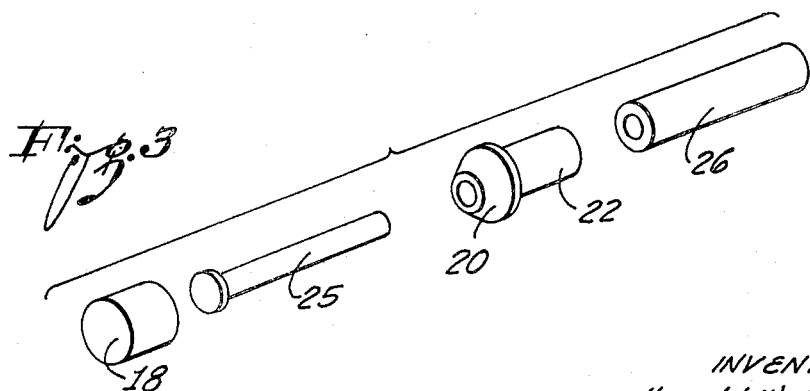
INVENTOR:
Harold W. Hart
ATTORNEYS

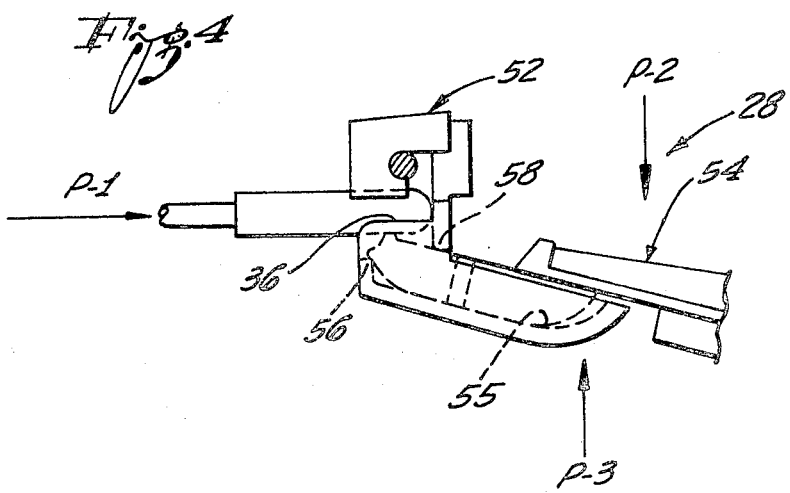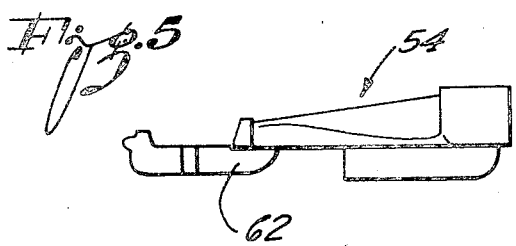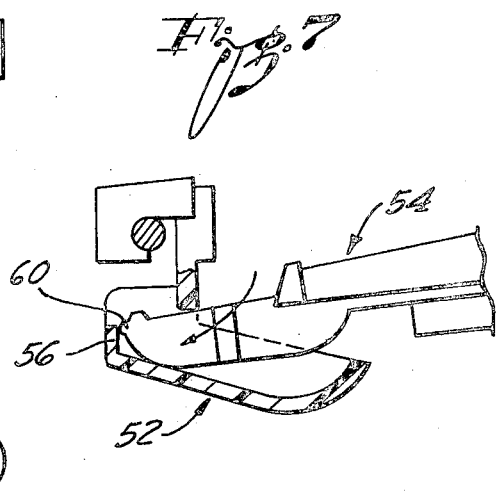

United States Patent Office 3,405,686
Patented Oct. 15, 1968

3,405,686
WATERING SYSTEM FOR NEWLY
HATCHED FOWLS
Harold W. Hart, Glendale, Calif., assignor to H. W. Hart
Mfg. Co., Glendale, Calif., a corporation of California
Filed Sept. 16, 1966, Ser. No. 579,810
11 Claims. (Cl. 119—75)

This invention relates to a system for supplying drinking water to fowls from the time the fowls are newly hatched through a period of growth at least approaching maturity. More particularly, the invention is directed to the need by large scale commercial poultrymen for such a system that meets the changing conditions during the growth period of fowls and that does so effectively with minimum attention and servicing.

From the time that the baby fowls are first hatched, they must have full access to drinking water but there must be no possibility of contamination of the drinking water by prolonged immersion of food particles with consequent bacterial action. Because the environment in general should be dry and because moistening the droppings on the floor results in breeding of flies, the water supply must be confined effectively at all times. A further important reason for effective confinement of the water is that if water wastage is completely eliminated, it becomes economical to give medication, for example expensive oral vaccine, to the baby fowls by adding the medication to the water supply. Such a medication procedure results in substantial saving in labor.

It has been found that the use of relatively small drinking cups in such a water system may be relied upon to confine the water at all times with no splashing onto the fowls or onto the floor and it has been further found that with only shallow water in the cups, young birds old enough to carry food particles will remove the food particles from the cups before bacteria action becomes a problem. Watering cups for this purpose are commonly provided with valves controlled by trigger members that are operated by pecking by the fowls. A basic difficulty arises from the fact that baby fowls are normally debeaked when a day old to prevent cannibalism, both the upper and lower beaks being cut short. The newly truncated beak is so sensitive that the baby fowl is not capable of pecking a valve-controlling trigger with substantial force. Consequently if a conventional trigger-operated cup is used, the water therein may possibly fail to be replenished and the consequent dehydration of baby fowls may cause a drastic rise in the mortality rate. It is apparent, therefore, that if any type of trigger-actuated watering cup is to be employed for baby fowls, there must be an inherent safeguard to insure the presence of water in the cup at all times. If is further apparent that to promote the education of the baby fowls in the use of automatic watering cups the trigger mechanism must be highly sensitive to respond to light pecks.

With the passage of time, the truncated beaks become less sensitive and because the trigger mechanism is highly sensitive all of the growing fowls learn to peck the triggers of the cups to obtain water. A new problem arises, however, because with the trigger highly sensitive and with the growing fowls becoming more and more aggressive in pecking the trigger, excess water is admitted to the cup to cause undue rise in the water level. Even if the water does not overflow, the high level results in the growing fowls splashing the water onto the floor. The higher water level, moreover, makes it more difficult for the fowls to remove food particles from the bottom of the cup. There comes a time, therefore, when the trigger mechanism must be either modified or replaced to provided greatly reduced sensitivity. With the sensitvity of the trigger greatly reduced, water is admitted to the cup only in response to a relatively forceful peck, water being admitted to the cup whenever needed with no likelihood of excessive release of water.

In a trigger-operated watering cup of the type to which the present invention pertains, the trigger is an angular member which functions as a lever and three different forces are involved in the lever action. Assuming that the valve is closed and the trigger correspondingly elevated, one of the three forces is the pressure of the water supply on the valve member to tend to keep the valve closed. The second force acting on the closed valve is the weight of the trigger which tends to open the valve in opposition to the pressure of the water supply. The third force arises from the displacement of the trigger in the water. Thus if the trigger is made of material of less specific gravity than water and the trigger is sufficiently immersed in the water in the cup, the buoyancy of the trigger tends to swing the trigger upward to nullify the weight of the trigger.

From the foregoing discussion of the forces involved in the trigger action of a water cup, it is apparent that one way of decreasing the sensitivity of the trigger mechanism as baby fowls increase in age is to increase the pressure of the water supply since the hydraulic pressure opposes the opening of the trigger-control valve. Accordingly one procedure heretofore followed for operating such a water system is to step up the water pressure with the passage of time.

For example, one prior procedure involves four stages. When the baby fowls are first hatched the pressure of the water supply is under 15″ of water and the trigger is a highly sensitive float. When the water level drops, the float gravitates downward to open the valve and then the rising water level causes the float to permit the valve to close. By virtue of this arrangement water is always available for the baby fowls. After a short period of time the water head is increased to, say 15″, so that the trigger will not operate by gravity to open the valve but if the trigger is pecked to open the valve, it will function as a float to close the valve. Thus the float will not open in response to lowering of the water level, a peck by a fowl being required. The water level fluctuates but a sufficient number of fowls peck the float to keep water available. At a still later stage in the growth of the fowls, the water head is increased, say to 18″, so that the hydraulic pressure that tends to keep the valve closed dominates the weight of the trigger. The valve opens only when the trigger is pecked and closes promptly. At a still later stage when the fowls reach maturity different watering cups are substituted employing non-buoyant triggers requiring strong pecking force for operation.

One disadvantage of the described prior art procedure is the necessity of repeatedly varying the water level. Another disadvantage is that the differences in levels is relatively small and critical, the difference between the first and second stage being only approximately 3″ of water and the difference between the second and third stage being only approximately 3″ of water.

Another disadvantage of the prior practice is that providing a pressure in the water system equivalent to a head as low as ten to fifteen inches introduces undesirable complications in the structure of the system. In many installations, for example, there are two or more tiers of cages for the fowls and if the water pressure must be controlled within close limits, the different levels of the cages must have different water feed lines. If one line is employed to supply two tiers the water perssure will either be too high for the lowest tier or too low for the highest tier.

Another disadvantage resides in the fact that the water pressure in the system is relied upon to keep the valves of the water cups closed when the water level in the cups is high. In any installation where a number of water cups are connected to a single supply line, the static pressure is relatively high when no cups are drawing water from the system but if several cups are drawing water simultaneously the pressure in the feed line drops drastically. Thus if the normal static water head is between ten and fifteen inches which is high enough to keep the valves tightly closed the pressure in the water line may periodically drop substantially below ten inches at some of the cups with consequent leakage of water through the valves to cause overflow at the cups.

The present invention meets all the problems involved in this situation by providing a water system which operates at a moderately high water head as distinguished from a relatively low head of ten to fifteen inches and uses the same moderate pressure both for supplying water to newly hatched fowls and for supplying water to young fowls that are several days old. The preferred practice of the invention employs a water head on the order of forty to forty-two inches and simply varies the characteristics of the trigger mechanisms in the cups to provide highly sensitive initial trigger action for newly hatched fowls and to change over to trigger action of substantially less sensitivity for older growing fowls. The static pressure head of forty to forty-two inches is so far above the low range of ten to fifteen inches that the pressure in the supply line does not drop to below the low range even when a large number of cup valves are opened simultaneously. The moderate pressure head of forty to forty-two inches is also high enough to supply more than one tier of cages.

To carry out this concept, the invention initially provides a buoyant trigger or float arm in each drinking cup that is highly sensitive to pecking forces because it is relatively long to provide advantageous leverage. To teach the baby fowls to peck the trigger for water, the trigger occupies a substantial portion of the area in plan of the interior of the cup to result in a high probability that random pecks will encounter the trigger. After about two weeks the sensitivity of the trigger mechanism is reduced simply by lessening the length of the buoyant trigger to such degree that the weight of the trigger alone cannot overcome the prevailing water pressure. At the moderately high pressure of forty to forty-two inches, a short buoyant trigger acts in the same manner as a conventional non-buoyant trigger in that it responds only to a peck of substantial force and will close promptly to avoid wastage of water.

The features and advantages of the invention may be understood from the following detailed description together with the accompanying drawings.

In the drawings, which are to be regarded as merely illustrative:

FIG. 1 is a plan view of a drinking cup connected to a supply conduit of a watering system;

FIG. 2 is a partly diagrammatic and partly sectional view with the section taken as indicated by the line 2—2 of FIG. 1 to show the working parts of the control mechanism;

FIG. 3 is an exploded view on an enlarged scale showing some of the parts that enter into the assembly of the control mechanism of a watering cup;

FIG. 4 is a diagram showing the forces involved in the operation of a trigger member;

FIG. 5 is a side elevation of a removable section of the buoyant float shown in FIGS. 1 and 2;

FIG. 6 is a plan view of the removable section; and

FIG. 7 is a sectional view showing how the removable section may be disengaged from the other or base section.

Referring to the drawings, FIGS. 1 and 2 show a portion of a conduit 10 of a water system which is preferably made of a suitable plastic and which has an outlet fitting 12 bonded thereto with an internal screw thread for connection to a watering cup 14. Preferably, but not necessarily, the watering cup 14 is a molded plastic body with an integral nipple 15 that screws into the outlet fitting 12. The nipple 15 provides a passage 16 through which water may flow from the conduit under control of a valve mechanism that extends through the passage.

The end of the plastic nipple 15 may form a convex conical valve seat for cooperation with an elastomeric valve member 18, but preferably such a valve seat is formed by a conical enlargement 20 of a ferrule or bushing 22 that is mounted in the outer end of the passage 16. The elastomeric valve member 18 is cup-shaped for cooperation with the convex conical valve seat and is mounted on an enlargement 24 of a pin 25 that is slidingly mounted in the ferrule 22 with sufficient clearance for adequate water flow through the ferrule. Fixedly mounted on the pin 25 by a forced fit, is a plunger 26 which serves, in effect, as an extension of the pin for moving the valve member 18 to open position in opposition to the water pressure in the conduit. The plunger 26 which is formed with a rounded nose for actuation by a suitable control member fits slidingly in the passage 16 with clearance for water flow.

The control member 28 shown in FIGS. 1 and 2 is a trigger that may be adapted to function solely as a float or may be adapted to function solely as a trigger.

The trigger 28 is in the form of a lever and for the purpose of pivotally mounting the lever, the cup 14 is provided with a transverse pin 34 which spans the interior of the cup and serves as a pivot means. In the construction shown two opposite walls of the cup 14 are formed with downwardly extending grooves 35 which are recessed at their lower ends to provide seats for the opposite ends of the transverse pin 34. The plastic walls of the cup are sufficiently flexible to permit the walls to be spread apart slightly for assembly of the transverse pin to the cup.

As indicated in FIG. 3 and best shown in FIG. 4, the float member 28 is formed with an angular slot 36 to receive the transverse pin 34, the slot having an entrance of slightly smaller width than the diameter of the pin to permit the float member to be forced onto the pin with a snap action. Once the float member is mounted on the transverse pin the restricted entrance to the angular slot opposes any upward movement of the float member relative to the pin and the float member seats firmly on the pin to resist in a positive manner any downward force against the float member such as a peck by a fowl.

At the closed position of the valve member 18 shown in FIG. 2, the plunger 26 is held at its rearward position by the pressure of the water against the valve member 18 and at this position the plunger holds the trigger 28 up as shown, the trigger being spaced above the bottom of the cup. Any force that tends to rotate the trigger 28 counterclockwise as viewed in FIG. 2 is limited by the rocking of a pair of spaced bosses of the float member against the inner surface of the cup, and, on the other hand, clockwise rotation of the float member is limited by movement of the trigger against the bottom wall of the cup. Downward movement of the trigger towards the bottom wall of the cup retracts the valve member 18 from the valve seat 20 to permit water to flow from the conduit 10 through the passage 16 into the cup 14. The trigger 28 is made of a plastic which is of sufficiently low specific gravity to be buoyant in water and for this purpose the float member may be made of polypropylene. Thus if the trigger 28 is immersed in water, the trigger tends to swing upward and thus permit water pressure to force the valve member 18 to closed position.

FIG. 4 shows diagrammatically the forces which affect the trigger 28. The arrow P-1 represents the force exerted by the plunger 26 in response to the pressure of water against the valve member 18. The arrow P-2 represents the force of gravity acting on the trigger 28 in a direction to tend to shift the plunger 26 for opening the valve. Finally, the arrow P-3 represents the buoyancy or the upward force on the trigger 28 that is created by the displacement of water by the trigger. Since the material of the trigger 28 is of lower specific gravity than water, the buoyancy force P-3 always exceeds the gravity force P-2 when the trigger is immersed in water. It is apparent that the buoyancy force P-3 tends to permit the water pressure represented by force P-1 to close the valve whereas the gravity force P-2 tends to open the valve in opposition to the water pressure. Thus the trigger 28 functions as a control float that automatically maintains a given minimum level of water in the cup.

FIG. 2 shows diagrammatically how a pipe indicated by a dotted line 45 may connect the supply conduit 10 to an overhead tank 46 that is kept filled with water under the control of a valve 48 that is operated by a float 50. It is apparent that the normal static head of water in the system is the distance H in FIG. 2 which is the difference between the level of the water in the overhead tank 46 and the level of the valve mechanism of a drinking cup that is connected to the conduit 10.

If none of the drinking cups is drawing water from the system the static head H will be in effect but several of the drinking cup valves may be opened simultaneously to cause a substantial drop in the pressure at a drinking cup. Thus in practice the hydraulic pressure that tends to keep the valves closed fluctuates over a given range below the magnitude of the head H. If the minimum pressure in this given range of fluctuation is less than the pressure necessary to keep a drinking cup valve firmly closed, there will be times when the valve will leak to admit excess water to the drinking cup. It has been noted in some installations that the minimum water pressure to prevent such leakage is a head of between ten and fifteen inches. Therefore the head H in FIG. 2 must be sufficiently above ten to fifteen inches to insure that the minimum pressure in the given range of fluctuation is not substantially lower than fifteen inches. It has been found that in a typical watering system of the character described wherein a large number of distributed watering cups are supplied by a single conduit, satisfactory operation is provided if the head H is on the order of forty to forty-two inches.

For the purpose of supplying water to newly hatched fowls, it is contemplated that the weight of the trigger 28 will be sufficient for the trigger to open the valve in opposition to the head H and at the same time the trigger will be sufficiently buoyant to permit the valve to close when the water level in the cup rises to a predetermined minimum. It is contemplated that by virtue of the buoyancy and length of the trigger, the trigger will be highly sensitive to respond to exceedingly light pecking forces. It is also contemplated that the area in plan of the buoyant trigger 28 will be a substantial portion of the area in plan of the interior of the drinking cup to result in a high probability that a random peck by a baby fowl into the interior of the cup will encounter the trigger to teach the baby fowl that the trigger will respond to pecks.

After a period of about two weeks in which the baby fowls grow and gain strength, the weight, extent and area of the trigger 28 is drastically reduced to lower the sensitivity of the trigger to such a degree that only a forceful well-aimed peck will operate the trigger to admit water into the cup. The reduction in sensitivity of the trigger, may, of course be accomplished by substituting one trigger for another but in the preferred practice of the invention the conversion is carried out by simply removing an outer end portion of the trigger. In this regard a feature of the present embodiment of the invention is that the trigger 28 is made in two separable sections, one section being a base section 52 that is operatively connected to the valve, the other section being a removable extension section 54 that is releasably connected to the base section.

As shown in FIG. 2, the base section 52 of the trigger 28 is recessed to form an upwardly facing seat 55 with the inner end of the seat forming an upwardly directed shoulder 56 and with a portion of the material of the base section overhanging the seat to form a downwardly directed shoulder 58. As shown in FIG. 2, the extension section 54 of the trigger 28 normally rests at its inner end in the seat 55 of the base section 52, the extension section hooking under the downward shoulder 58 and fulcruming on the base section. The extension section is formed with a small lug portion 60 that engages the upward shoulder 56.

The shape and dimensions of the two trigger sections 52 and 54 and in the inherent resiliency of the plastic material are such that the extension section may be engaged and disengaged with the base section with snap action. Thus the lug portion 60 of the extension section 54 snaps into engagement with the upward shoulder 56, the lug portion and upward shoulder being cooperating parts of the two sections that function as a detent for releasably maintaining the extension section in engagement with the base section.

As best shown in FIG. 5 the extension section 54 is formed with an inner end portion 62 that is shaped and dimensioned for snug fit in the seat 55 of the base section 52. FIG. 7 shows how the extension section 54 may be swung upward relative to the section 52 for the purpose of releasing the extension section from the base section. The extension section may be again engaged with the base section whenever desired by an obvious manipulation which involves initially positioning the extension section relative to the base section in the manner indicated in FIG. 7.

The manner in which the invention functions for its purpose may be readily understood from the foregoing description. For initial use with newly hatched baby fowls, the extension section 54 is assembled to the base section 52 to make a two-part trigger 28 that functions as a float for automatically maintaining a given minimum level of water in the watering cup. The two-part trigger 28 is highly sensitive to impact forces because of the relatively long length of the lever arm and, as may be seen in FIG. 1 the two-part trigger extends over such a large portion of the interior of the drinking cup that if a baby fowl makes a random peck into the interior of the cup it is highly probable that the random peck will encounter the trigger to teach the baby fowl that the trigger is responsive to pecks.

When the baby fowls are approximately two weeks old, it is a simple matter to remove the extension sections 54 from the triggers 28 of all of the cups to make the triggers less sensitive. The pressure in the water line is sufficiently high to keep the valves of the drinking cups closed with the shortened triggers 28 of the drinking cups elevated, the shortened triggers being non-responsive to changes in water level in the drinking cups. Thus a well aimed and relatively forceful peck is required to actuate a shortened and lightened trigger 28 for the admission of water into a drinking cup. When the shortened trigger is pecked by a fowl it opens to admit water but immediately closes. Water is admitted to the drinking cup only as required by the fowls and no wastage of water occurs.

My description in specific detail of the selected embodiment of the invention will suggest various changes, substitutions and other departures from my disclosure within the spirit and scope of the appended claims.

I claim:

1. A method of supplying water to newly hatched fowls, including the steps of:
   providing conduit means with several distributed outlets;
   providing individual water cups at the several outlets;
   providing each cup with a valve urged to closed position by the water pressure in the cup with the valve controlled by a trigger of lower specific gravity than the water to serve as a float to maintain a given minimum water level in the cup automatically with the trigger highly sensitive to admit water in response to a light impact by the beak of a baby fowl and with the trigger extending over a substantial portion of the inside area of the cup to favor probability of light impacts against the trigger by random pecks by the baby fowls;

supplying water to the conduit means at a static pressure sufficiently high to prevent the water pressure at any valve from dropping to a level low enough to permit leakage through the valve when a plurality of the cups draw water from the conduit means simultaneously; and as the age of the fowls increases, reducing the sensitivity of the trigger in each cup to require higher pecking force for the admission of water and decreasing the extension of the trigger across the inside area of the cup to require accurate forceful pecking of a relatively small target to admit water to the cup.

2. A method as set forth in claim 1 in which the step of reducing the sensitivity and extent of the trigger is carried out by removing a portion of the trigger.

3. A method as set forth in claim 1 in which water is supplied to the conduit means at a head in excess of 30″.

4. A method as set forth in claim 1 in which the water is supplied to the conduit means at a head on the order of 40–42″.

5. An apparatus for supplying water to newly hatched fowls, including:

conduit means supplied with water under pressure and having several distributed outlets;

water cups at the respective outlets to receive water for the newly hatched fowls;

valve means at each outlet to control the admission of water to the corresponding cup, said valve means being urged to closed position by the water pressure in the conduit means; and fowl actuated control means for each valve including a trigger inside the cup to open the valve in response to a peck by a fowl, the trigger having a lower specific gravity than water and having sufficient weight in the absence of water to open the valve in opposition to the water pressure whereby the trigger serves as a float to maintain a given minimum water level in the cup automatically;

said trigger being highly sensitive to admit water in response to a light impact by the beak of a baby fowl;

said trigger extending across a substantial portion of the inside area of the cup to increase the probability of impact against the trigger by random pecks;

said trigger having a detachable portion constituting a means for decreasing its size and sensitivity when needed by baby fowl as their age increases.

6. An apparatus as set forth in claim 5 in which said trigger comprises two separate parts shaped and dimensioned for mutual manual releasable engagement.

7. An apparatus as set forth in claim 5 in which said trigger member comprises a relatively short base section and a relatively long extension section, said base section forming a seat for the inner end of the extension section, and which includes cooperative detent means on the two sections respectively to releasably retain the extension section in engagement with the base section.

8. An apparatus as set forth in claim 5 in which said trigger member has a relatively short base section and a separate relatively long extension section, the inner end of the extension section making hook engagement with the base section and the extension section fulcruming on the base section.

9. In a system for supplying water to baby fowls wherein conduit means with several distributed watering cups is connected to a water source with a valve at each watering cup controlled by a trigger in the form of a lever in the cup to admit water to the cup in response to a peck against the lever by a fowl and wherein the water pressure in the conduit means biases each valve to closed position and the weight of the lever tends to swing the lever downward to open the valve, the improvement comprising:

the static water pressure at said source being a given pressure sufficiently higher than a head of 10″ to cause the pressure at each valve to fluctuate over a given range higher than a head of 10″ as a varying number of watering cups draw water simultaneously from the conduit means;

the weight and length of each of said levers being sufficient to open the corresponding valve in opposition to said given pressure;

each of said levers having a specific gravity less than the specific gravity of the water to serve as a float to permit the corresponding valve to close in response to rise of water in the corresponding cup to a given minimum level, whereby the lever functions automatically to maintain the given means level for newly hatched fowls; and a portion of said lever being removable to make the weight of the lever insufficient to open the valve in opposition to the pressures in said given range when the fowls increase in age thereby to make the lever responsive only to forceful pecks by the fowls of increased age.

10. An improvement as set forth in claim 9 in which the lever is made of two separable sections whereby one section may be removed to lower the weight of the lever.

11. An improvement as set forth in claim 9 in which said trigger comprises a relatively short base section and a separate relatively long extension section; and in which the two sections are shaped and dimensioned relative to each other for mutual engagement and disengagement with a snap action.

References Cited

UNITED STATES PATENTS

| 1,479,499 | 1/1924 | Ferris | 119—75 |
| 1,526,249 | 2/1925 | Smith | 119—80 |
| 2,362,620 | 11/1944 | Eischens | 119—75 |
| 2,512,510 | 6/1950 | Wartes | 119—73 |
| 2,628,631 | 2/1953 | Boyd | 137—430 X |
| 2,662,503 | 12/1953 | Johnson | 119—80 |
| 2,845,046 | 7/1958 | Hart | 119—75 |
| 3,353,518 | 11/1967 | Hart | 119—75 |

ALDRICH F. MEDBERY, *Primary Examiner.*